(12) United States Patent
Antonich et al.

(10) Patent No.: US 8,341,800 B2
(45) Date of Patent: Jan. 1, 2013

(54) BREAK-AWAY WIPER EXTENSION FOR VEE WINDOWS

(75) Inventors: Gary Lee Antonich, Saint Francis, MN (US); John Francis Revolinski, Minneapolis, MN (US)

(73) Assignee: BAE Systems Land & Armaments L. P., Santa Clara, CA (US)

( * ) Notice: Subject to any disclaimer, the term of this patent is extended or adjusted under 35 U.S.C. 154(b) by 0 days.

(21) Appl. No.: 13/294,342

(22) Filed: Nov. 11, 2011

(65) Prior Publication Data

US 2012/0124766 A1 May 24, 2012

Related U.S. Application Data

(60) Provisional application No. 61/416,125, filed on Nov. 22, 2010.

(51) Int. Cl.
*B60S 1/34* (2006.01)

(52) U.S. Cl. ............ 15/250.34; 15/250.31; 403/DIG. 3; 296/96.15

(58) Field of Classification Search ............... 15/250.19, 15/250.34, 250.31, 250.21, 250.3; 403/DIG. 3; 296/96.15, 96.2
See application file for complete search history.

(56) References Cited

U.S. PATENT DOCUMENTS

| | | | | |
|---|---|---|---|---|
| 2,286,035 A | * | 6/1942 | Horton et al. | ................. 403/202 |
| 2,412,319 A | * | 12/1946 | Carey | ......................... 15/250.21 |
| 2,678,460 A | | 8/1949 | Oishei | |
| 2,533,963 A | * | 12/1950 | Sacchini | ..................... 15/250.21 |
| 6,026,536 A | * | 2/2000 | Miller et al. | ............... 15/250.31 |
| 6,505,376 B1 | | 1/2003 | Kagawa | |
| 6,513,186 B1 | | 2/2003 | Zimmer | |
| 6,701,569 B1 | | 3/2004 | Benner | |
| 6,792,643 B1 | * | 9/2004 | Ponziani | .................... 15/250.31 |
| 6,854,154 B2 | | 2/2005 | Masuda | |
| 7,941,892 B2 | | 5/2011 | Kraus et al. | |
| 8,066,319 B2 | | 11/2011 | Hafften et al. | |
| 2006/0175866 A1 | | 8/2006 | Dankert et al. | |
| 2007/0124887 A1 | | 6/2007 | Reid et al. | |
| 2007/0289081 A1 | * | 12/2007 | Kraus et al. | ................ 15/250.34 |
| 2008/0276401 A1 | * | 11/2008 | Renius et al. | ................ 15/250.3 |
| 2012/0032470 A1 | | 2/2012 | Hafften et al. | |

FOREIGN PATENT DOCUMENTS

JP 2000-326830 * 11/2000

(Continued)

OTHER PUBLICATIONS

File History for U.S. Appl. No. 13/304,016, filed Nov. 23, 2011. Inventors: Michael K. Hafften et al.

(Continued)

*Primary Examiner* — Gary Graham
(74) *Attorney, Agent, or Firm* — Patterson Thuente Christensen Pedersen, P.A.

(57) ABSTRACT

A break-away wiper arm assembly which allows a vehicle escape window to be opened rapidly without any delays or undue forces to impede the escape of the vehicle crew. The invention uses a two piece coupling held together using a retaining ring. As the window is pushed open, the window frame pushes against the wiper arm which overcomes the retaining ring retention force allowing the wiper arm to break away, clearing the area in front of the window for free motion of the window and the unimpeded exit of vehicle occupants.

9 Claims, 14 Drawing Sheets

FOREIGN PATENT DOCUMENTS

WO    WO 2008/118151 A2    10/2008

OTHER PUBLICATIONS

File History for U.S. Patent No. 8,066,319 B2, issued Nov. 29, 2011. Inventors: Michael L. Hafften et al.

File History for U.S. Appl. No. 13/279,838, mailed Oct. 24, 2011. Inventors: Michael L. Hafften et al.

International Search Report and Written Opinion for PCT Application No. PCT/US2011/060301, mailed on Jun. 28, 2012 (8 pgs.).

* cited by examiner

BREAK-AWAY WIPER EXTENSION FOR VEE WINDOWS

RELATED APPLICATIONS

The present invention claims the benefit of U.S. Provisional Application No. 61/416,125, filed Nov. 22, 2010 and incorporated herein in its entirety by reference.

FIELD OF THE INVENTION

This invention relates generally to the windshield wiper arm on armored vehicles. More particularly, this invention relates to a wiper extension that allows for easy windshield wiper arm breakaway to avoid interference with a specialized vehicle window, such as a VEE Window™ (Vehicle Emergency Escape Window), that is ejected from the vehicle in an emergency situation and to further avoid interference with passengers exiting through the window opening.

BACKGROUND OF THE INVENTION

Insurgent attacks on U.S. troops supporting ongoing operations for the Global War On Terrorism in Iraq and Afghanistan have exposed vulnerabilities of the ground vehicles used by our troops. Consequently, the HMMWV (commonly known as HumVee) and other light tactical military vehicles, are being up-armored to counter the insurgent threats and provide an increased level of soldier protection. A new issue results in that the additional weight of the armor and associated upward shift in center of gravity (CG) has caused these vehicles to become increasingly unstable and difficult for the troops to control. Numerous rollover accidents have and continue to occur given the tendency of these vehicles to go out of control and tip during evasive maneuvering, off-road travel and IED/RPG attack. When an up-armored vehicle rolls over, many times the crew cannot egress via the doors due to the weight of the armor on the doors, or jamming of doors from the vehicle frame twisting. The gunner's station is not an option for exit either if the vehicle is up-side-down. The result is that the crew is often killed due to vehicle fires, follow-up insurgent attacks, trauma injuries and drowning as they attempt to egress the vehicle. Therefore there is a need for an emergency egress system for the up-armored vehicles.

Transparent armored vehicle escape windows are mounted as the windshield of armored vehicles. These windows contain features to allow the crew to unlatch the armored window and push the windows out of their respective mountings to facilitate escape of the crew. Specifically, BAE Systems manufactures a window referred to as a VEE Window™ that allows a crew inside an armored vehicle such as a HMMWV or MRAP to quickly remove the ballistic windshield and escape during an emergency, such as a rollover or accident. For example, a crew member in a vehicle with VEE windows who is able to move freely can create a passage for escape by simply pulling out the window locking pins, turning the appropriate latches, and pushing the window out of the frame.

In past designs, however, the windshield wiper arm mounted in the vicinity of the windows may impede the opening of these windows. In most cases, the wiper arm extends across the armored window. The wiper arm, mounted through the window frame, remains in place when the armored window is dislodged. Existing wiper arms interfere and prevent the ejection of the escape armored window. In some cases, the possibility of wiper snap-back or being poked or impaled by the wipers may pose significant risks to persons seeking egress from the vehicle. In other cases, the wiper arms could catch on clothing or equipment that might hinder or interfere with vehicle egress.

Therefore, a design is sought that will enable windows to be ejected from armored vehicles without wiper arm interference. Moreover, a design is sought which will promote safe egress from the vehicle and minimize risks of personal injury to vehicle occupants.

SUMMARY OF THE INVENTION

The invention is generally directed to a break-away wiper arm assembly which allows a vehicle escape window to be opened rapidly without any delays or undue forces from the wiper assembly to impede the escape of the vehicle crew. In a first embodiment, the invention uses a two piece coupling joined using a retaining ring. As the armored window is pushed out of the window frame, the window impinges against the wiper arm. The outward force applied to the armored window must overcome the retaining ring retention force for the wiper arm to break away, clearing the area in front of the window for free motion of the window.

Embodiments of this invention provide wiper extensions enabling the vehicle windshield wiper arm and all of its attaching component hardware to be easily released from the vehicle wiper arm restraining hardware. The thickness of the armored pane drives the length of the wiper extension. The assembly of the wiper extension is designed to include a torque cap, an adapter shaft, and a retaining ring. In general, the torque cap is the interface between the existing vehicle wiper arm shaft and the break-away assembly. The adapter shaft is designed to be the break-away portion of the assembly. Finally, the retaining ring provides the necessary retention force to hold the torque cap and the adapter shaft together, but also provides the weak link in order for the adapter shaft to be separated from the torque cap with a given amount of applied force.

By allowing the wiper arm to freely break away from the vehicle, wiper hardware that could potentially catch on personnel clothing or equipment is eliminated, thereby, allowing free egress from the vehicle window opening. Additionally, since the wiper arm assembly is no longer attached to the vehicle, this also prevents the wiper arm from inadvertently springing back to the position it was in prior to the window being pushed out and causing any potential personal injury from snapping back of the wiper.

The present invention further allows for the use of the existing wiper arms. Due to the thickness of the armored panes, the wiper extension allows for the incorporation of the majority of the existing wiper assembly.

DETAILED DESCRIPTION OF THE DRAWINGS

The invention may be embodied in other specific forms without departing from the essential attributes thereof, therefore, the illustrated embodiments should be considered in all respects as illustrative and not restrictive.

Figure 1:
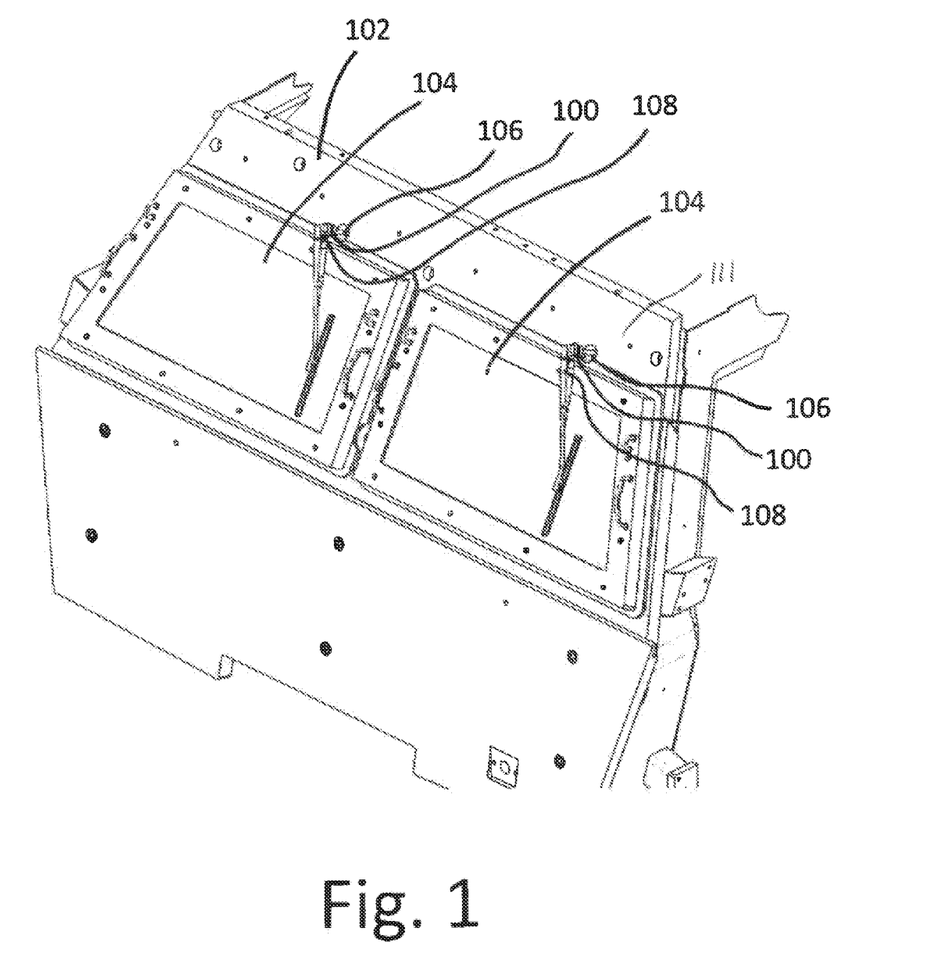
FIG. 1 is a perspective view of an armored vehicle with a windshield equipped with wiper blades and wiper extensions according to an embodiment of the invention.
Figure 2:
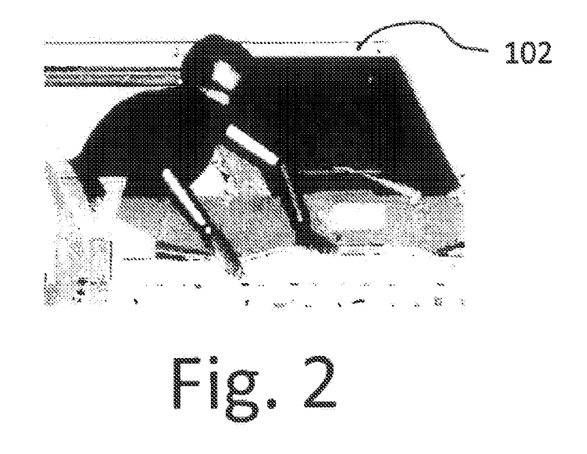
FIG. 2 is a perspective view of an armored vehicle in which the windshield has been removed and an occupant is exiting through the window opening.
Figure 3:
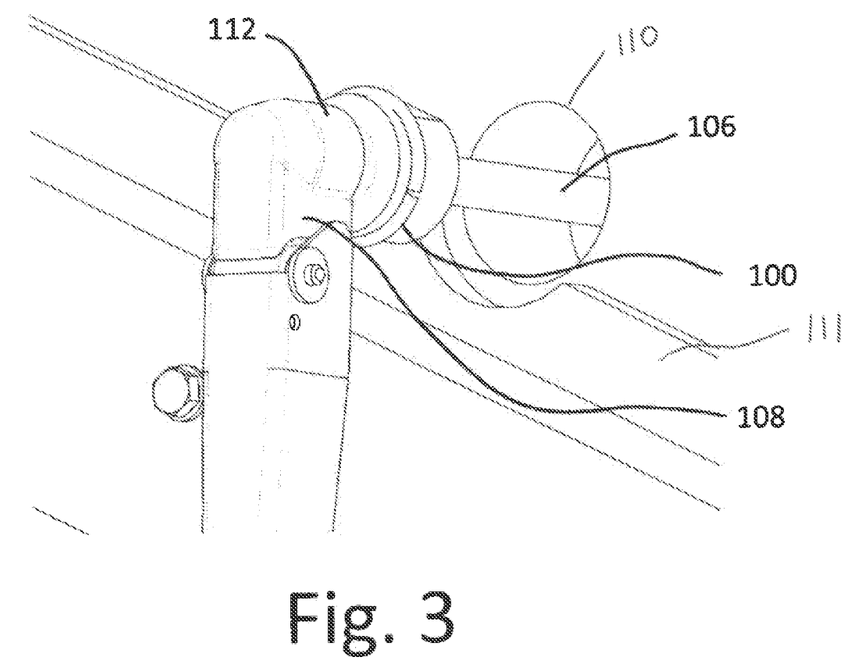
FIG. 3 is a close up perspective view of a wiper extension assembled together with a wiper arm and wiper motor shaft according to an embodiment of the invention.

FIGS. 1-3 show an example of the wiper extension 100 and the basic environment in which embodiments of the present invention may be used. Specifically, FIG. 1 shows an armored vehicle 102 such as a HMMWV with a windshield that is equipped with VEE Windows™ 104. The armored escape windows 104 are thicker than the conventional vehicle window in order to provide ballistic protection to the occupants. The wiper extensions 100 are disposed between the existing wiper motor shaft 106 and the windshield wiper arm 108 for each of the windows 104. The wiper blade 109 extends from the distal end of the windshield wiper arm 108. The wiper motor shaft 106 extends through channel 110 in armored window frame 111.

FIG. 2 shows an example of an armored vehicle 102 in which the windshield has been removed and an individual is exiting through the window opening. Next, FIG. 3 shows a detailed view of the wiper extension 100 connected in axial alignment with a wiper motor shaft 106 and a fitting 112 of a windshield wiper 108. Both the wiper motor shaft 106 and the windshield wiper 108 are existing components found in many armored vehicles such as HMMWVs. Accordingly, in various embodiments the wiper extension 100 is simply intended to be added to existing components and to modify such wiper designs.

Figure 4:
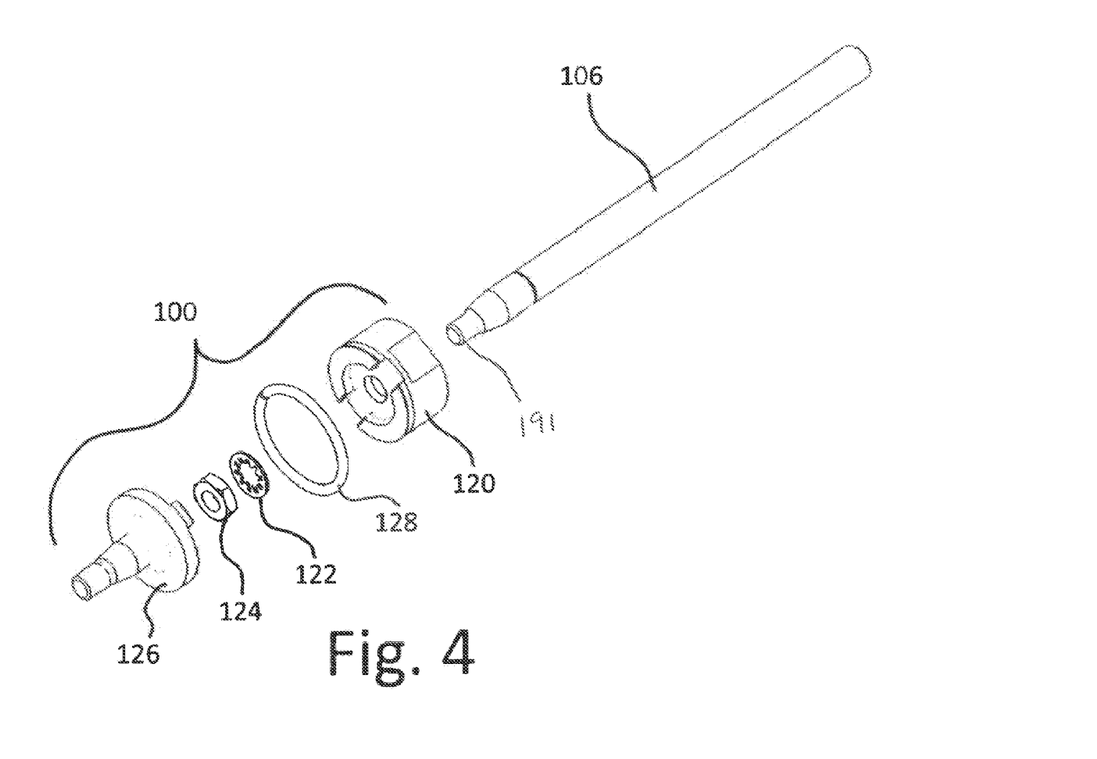
FIG. 4 is an exploded view of the wiper extension and a wiper motor shaft according to an embodiment of the invention.
Figure 5:
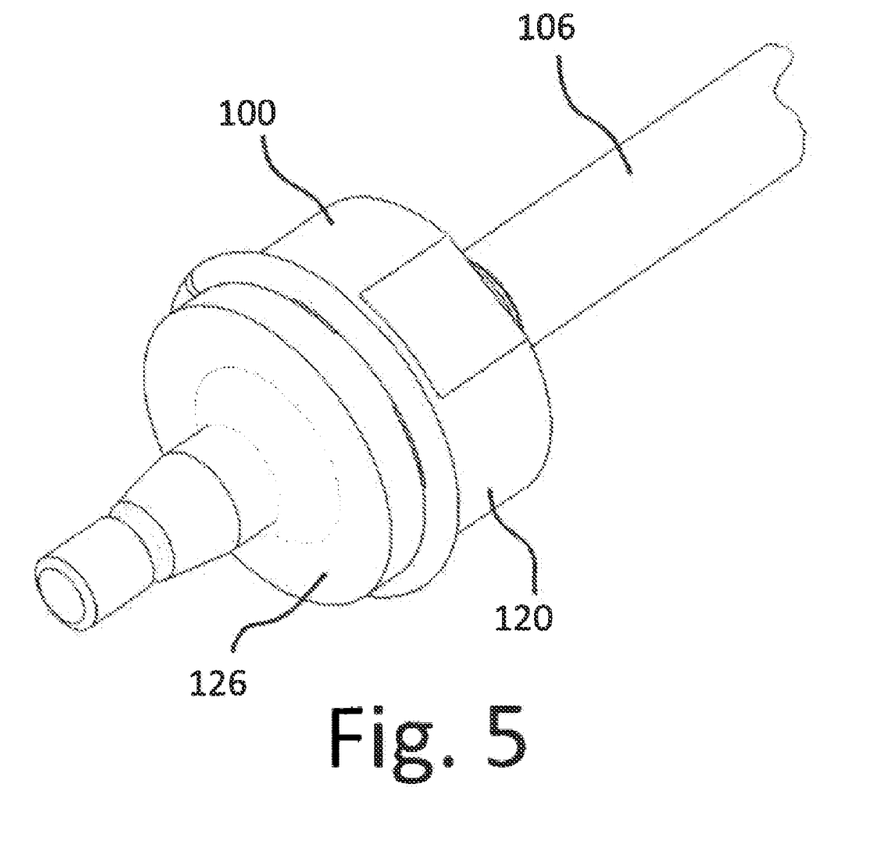
FIG. 5 is an assembled view of the wiper extension and a wiper motor shaft according to an embodiment of the invention.
Figure 6:
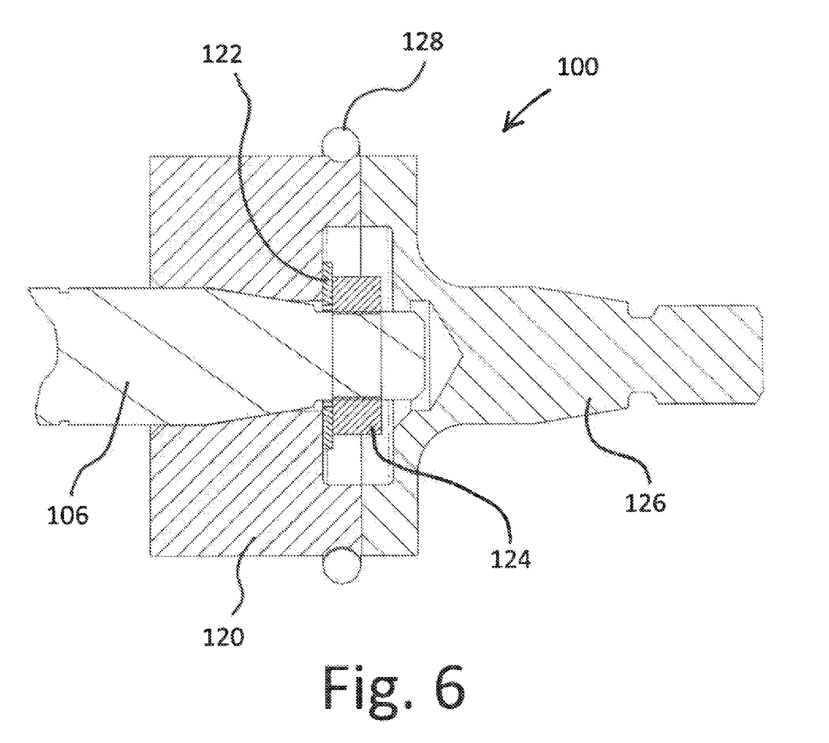
FIG. 6 is a cross-sectional view of the assembled wiper extension and a wiper motor shaft according to an embodiment of the invention.
Figure 7:
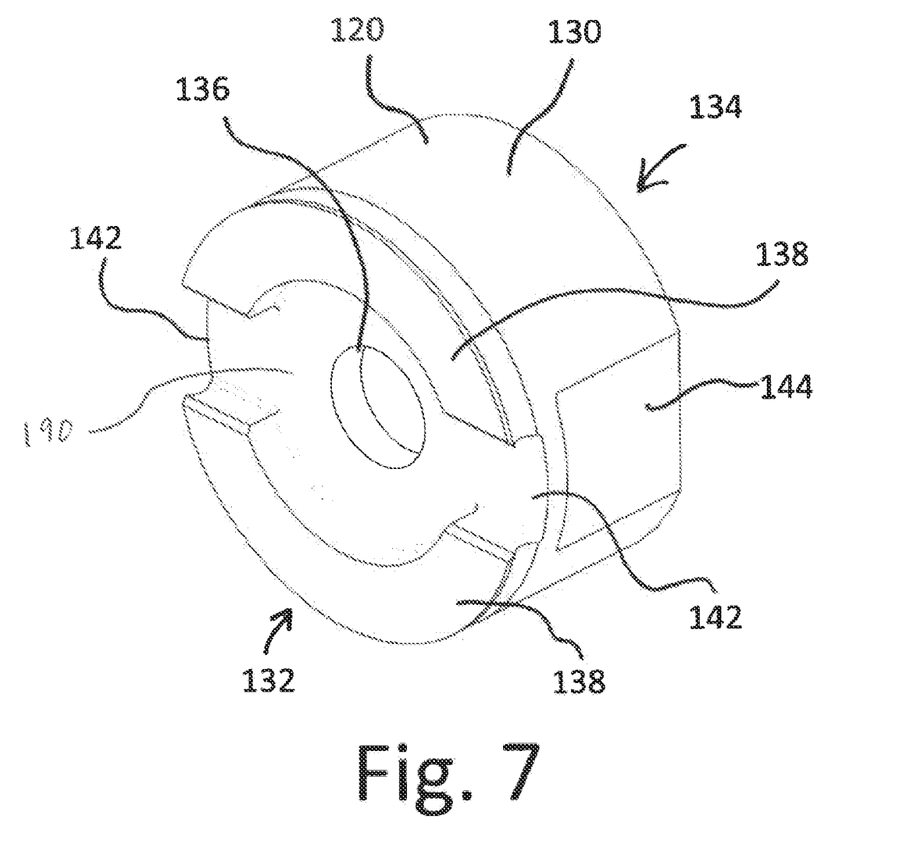
FIG. 7 is a front corner perspective view of the torque cap of the wiper extension according to an embodiment of the invention.
Figure 8:
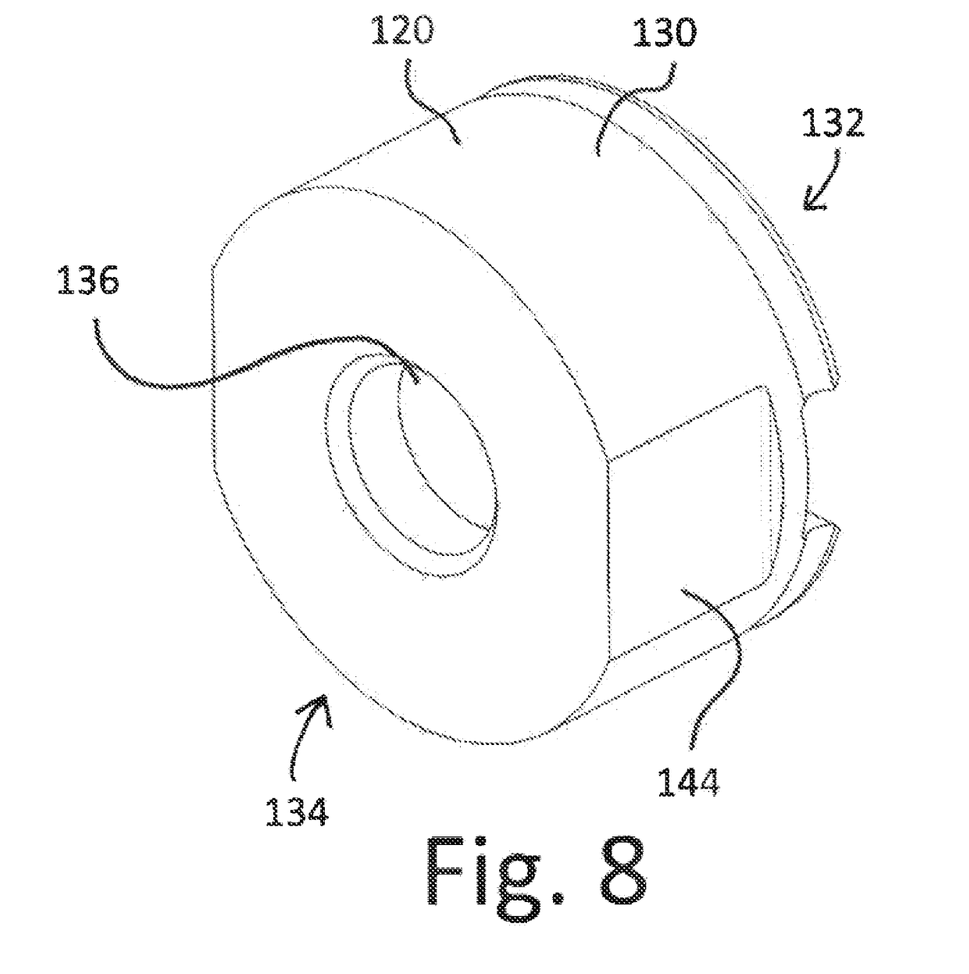
FIG. 8 is a back corner perspective view of the torque cap of the wiper extension according to an embodiment of the invention.
Figures 9, 9A, 9B:
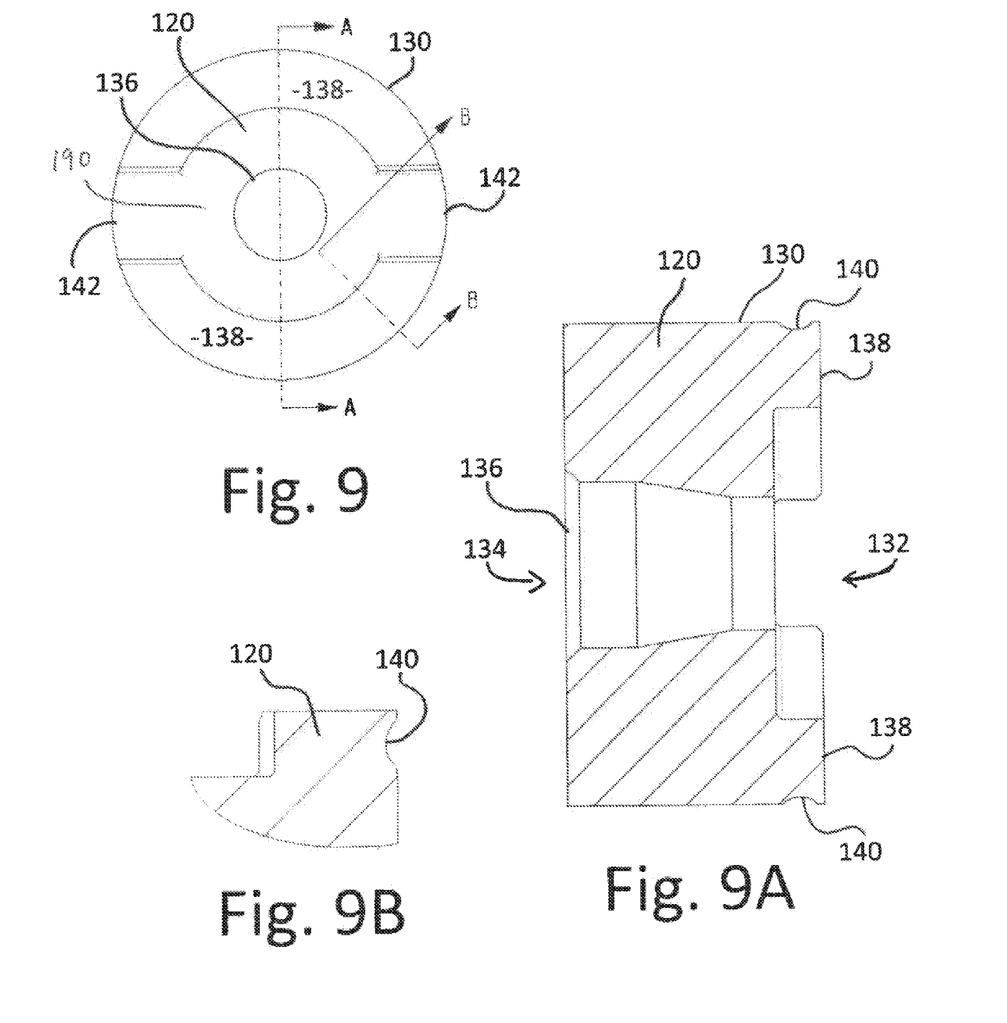
FIG. 9 is a front end view of the torque cap of the wiper extension according to an embodiment of the invention.
FIG. 9A is a cross-sectional view of the torque cap of the wiper extension taken along section A-A of FIG. 9 according to an embodiment of the invention.
FIG. 9B is a cross-sectional view of the torque cap of the wiper extension taken along section B-B of FIG. 9 according to an embodiment of the invention.
Figure 10:
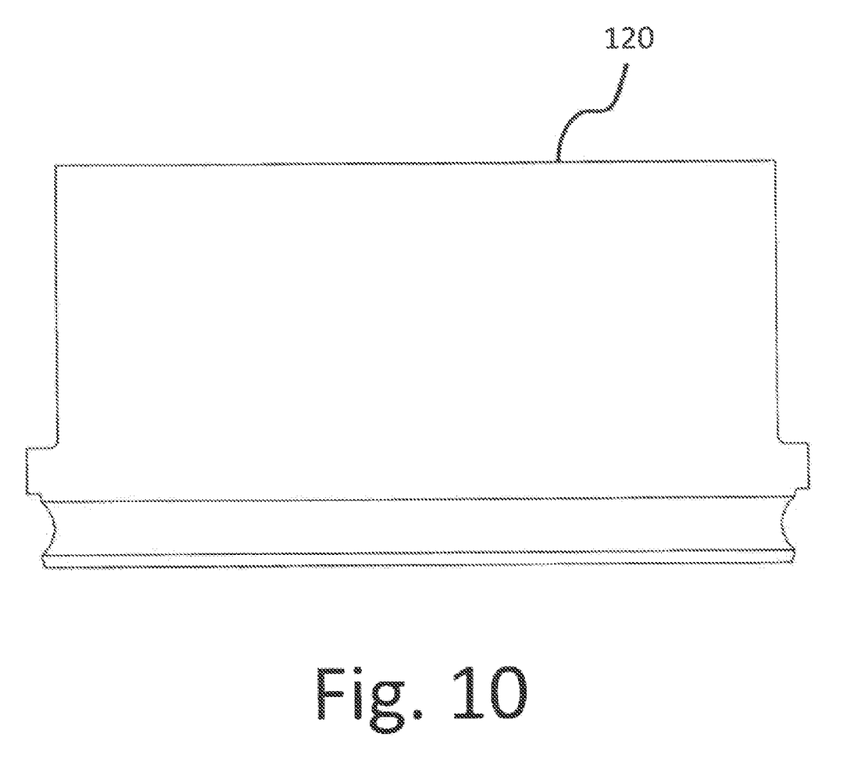
FIG. 10 is a top view of the torque cap of the wiper extension according to an embodiment of the invention.
Figure 11:
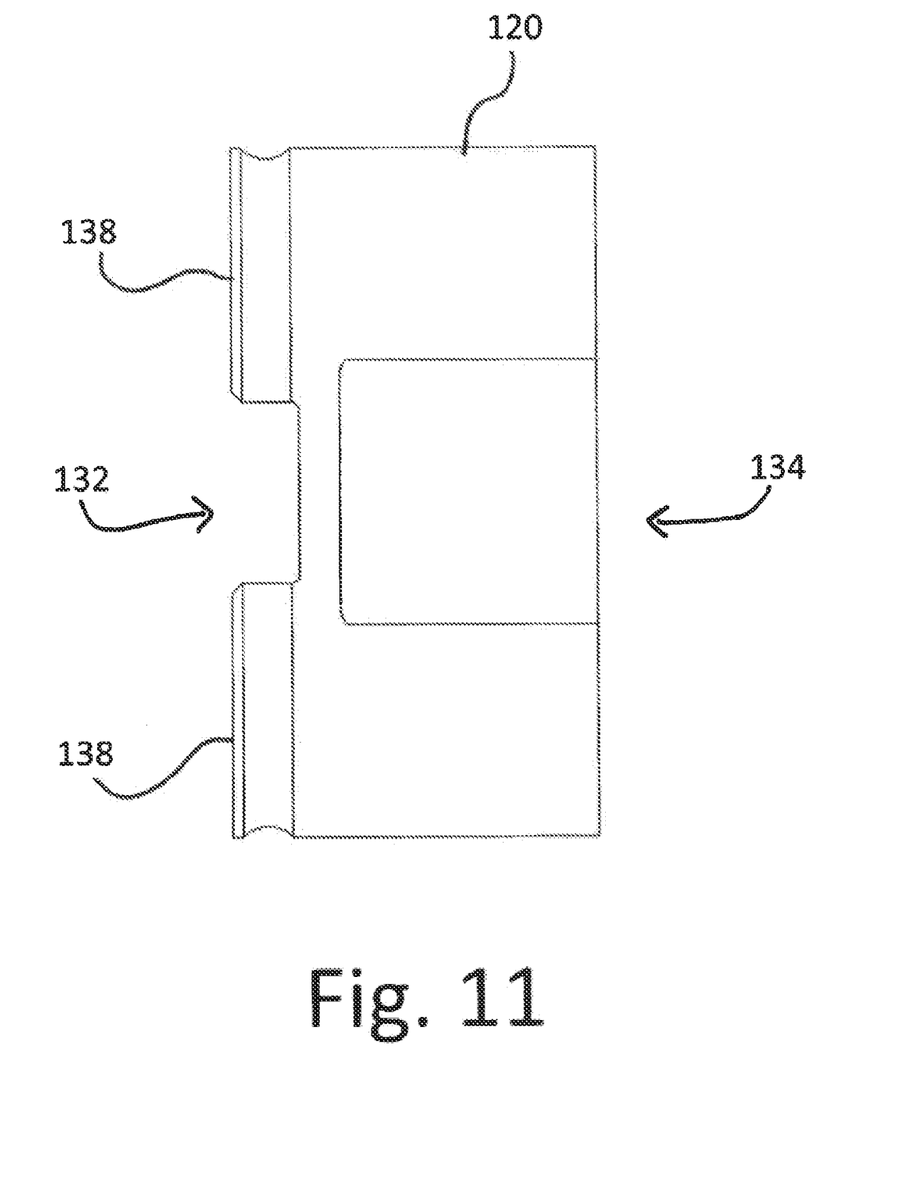
FIG. 11 is a side view of the torque cap of the wiper extension according to an embodiment of the invention.
Figure 12:
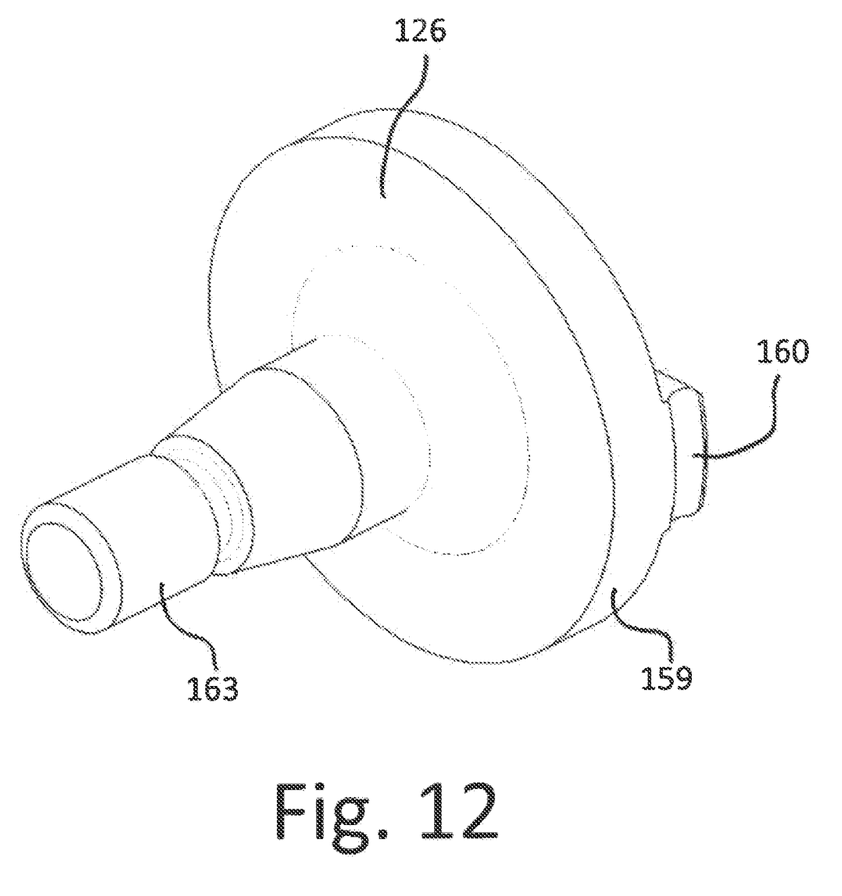
FIG. 12 is a front corner perspective view of the adapter shaft of the wiper extension according to an embodiment of the invention.
Figure 13:
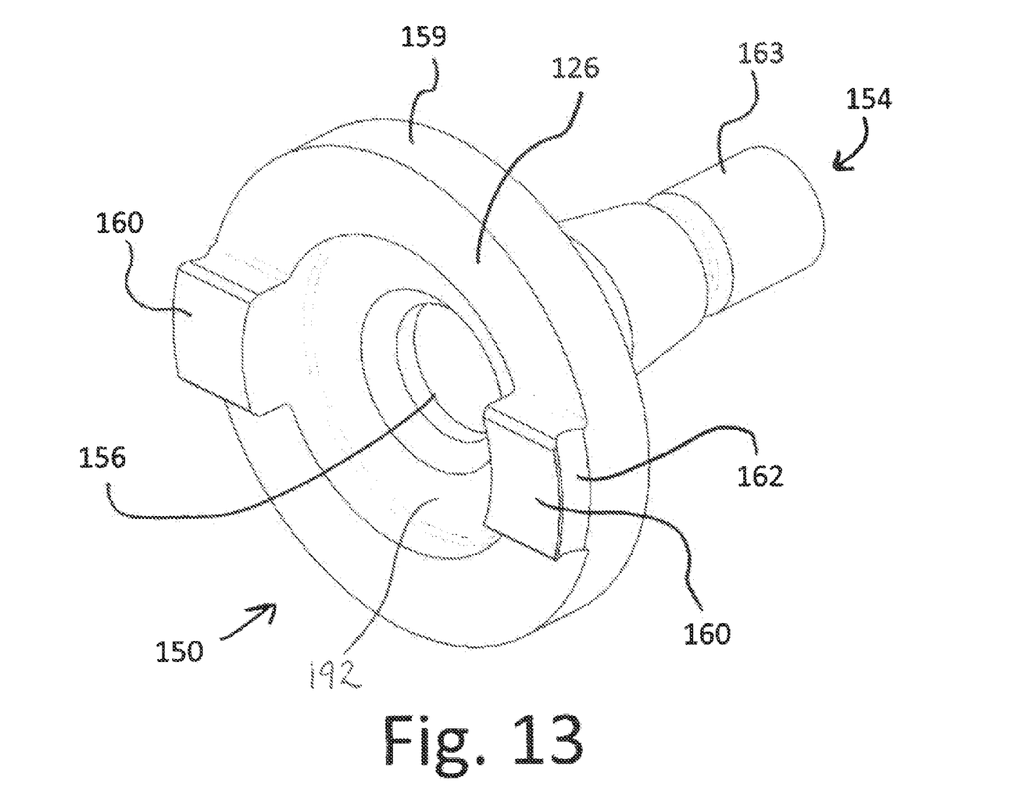
FIG. 13 is a back corner perspective view of the adapter shaft of the wiper extension according to an embodiment of the invention.
Figures 14, 14A, 14B:
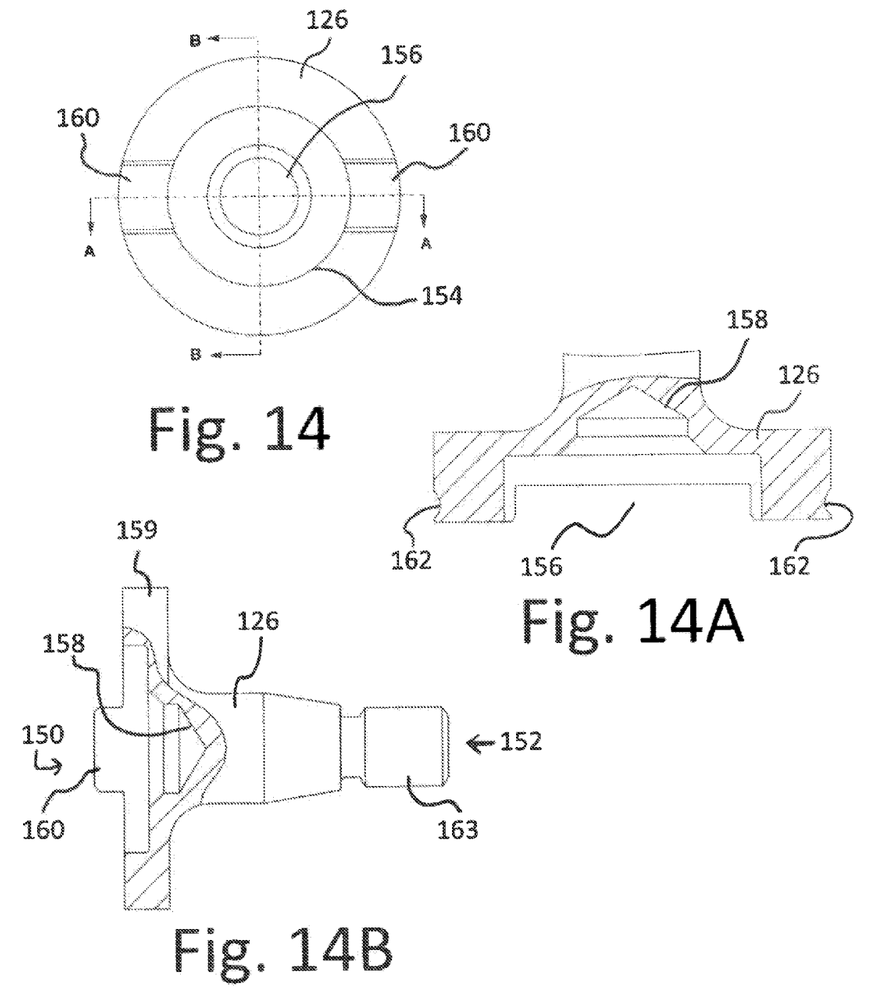
FIG. 14 is a back end view of the adapter shaft of the wiper extension according to an embodiment of the invention.
FIG. 14A is a cross-sectional view of the adapter shaft of the wiper extension taken along section A-A of FIG. 14 according to an embodiment of the invention.
FIG. 14B is a cross-sectional view of the adapter shaft of the wiper extension taken along section B-B of FIG. 14 according to an embodiment of the invention.
Figure 15:
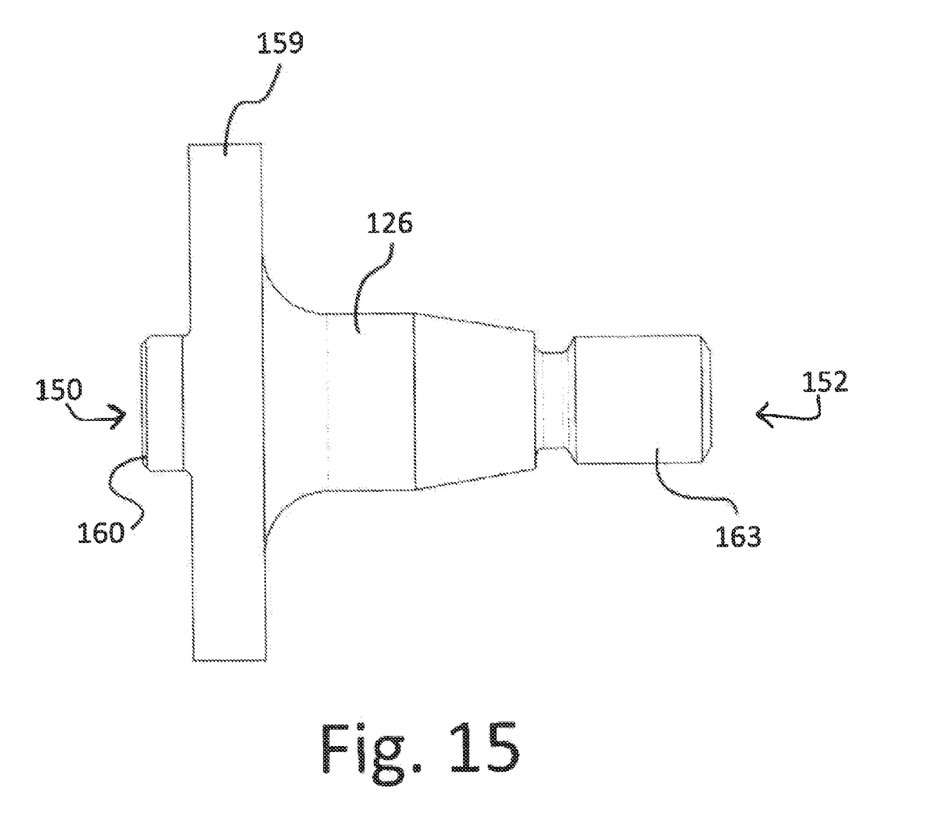
FIG. 15 is a side view of the adapter shaft of the wiper extension according to an embodiment of the invention.

The wiper extension 100 is shown in FIGS. 4-6 together with the wiper motor shaft 106. In general, the break-away automotive extension wiper assembly 100 consists of a torque cap 120, locking washer 122, locknut 124, adapter shaft 126, and retaining ring 128. The wiper extension assembly 100 is accordingly shown together with shaft 106 in an exploded view in FIG. 4, in an assembled view in FIG. 5, and in a cross sectional assembled view in FIG. 6. In general, the torque cap 120 is securely fastened to the vehicle's existing wiper arm shaft 106 with a locking washer 122 and locknut 124 and provides the interface between the existing vehicle wiper arm shaft 106 and the break-away wiper extension assembly 100. Adapter shaft 126 is the break-away component in the break-away wiper extension assembly 100.

In general, adapter shaft 126 is held on by a retaining ring 128. Retaining ring 128 is a fastener consisting of a semi-flexible ring with open ends which can be snapped into place in a groove within torque cap 120. The groove 140 permits rotation of the retaining ring 128. The retaining ring 128 prevents lateral movement of the adapter shaft 126. Retaining ring 128 provides the necessary retention force to hold the torque cap 120 and the adapter shaft 126 together as a unit. The retaining ring 128 also acts as a weak link in the system and allows the adapter shaft 126 to be separated from the torque cap 120 when an applied force is induced on the wiper arm 108.

FIGS. 7-11 provide more detailed views of embodiments of the torque cap 120. Torque cap 120 is a generally cylindrically shaped component having a generally curved, tubular outer surface 130, opposing first and second ends 132 and 134, and a central aperture 136 that axially extends through body of the torque cap 120. The central aperture 136 having a varying diameter which is sized to accommodate an inserted motor shaft 106. The torque cap 120 further has two arcuate projection surfaces 138 extending from the first end 132. Each of the arcuate projection surfaces 138 extending partially around the perimeter of one end of the torque cap 120 in concentric relation to the central aperture 136. Further, each of the arcuate projections 138 has a groove 140 on the external surface that defines a recessed area to capture retaining ring 128 when the wiper extension 100 is assembled. The arcuate projections 138 further define two recessed perimeter features 142 in the torque cap 120 between the two arcuate projections 138. These recessed perimeter features 142 are sized to couple with tab protrusions 160 of the adapter shaft 126 when the wiper extension 100 is assembled, as seen in FIG. 5 for example. The first end 132 further defines a circular recessed area 190 that has arcuate projections 138 as outer margins. Circular recessed area 190 is sized to accommodate insertion of locking washer 122 and lock nut 124 about wiper arm shaft end 191 Further, the generally curved outer surface 130 of the torque cap 120 contains two flat recessed features 144 that provide a gripping surface.

FIGS. 12-15 provide further detailed views of embodiments of the adapter shaft 126. In general, adapter shaft 126 is a protrusion having a frusto-conical type shape defined by a plurality of axially extending segments of various diameters and surface features. The adapter shaft 126 having a first end 150 and a second end 152. At the first end 150 a centrally located aperture 154 forms a bore hole 156 that defines an opening having various generally decreasing diameters along its length that culminates with a cone shaped cap 158. The centrally located aperture 154 is sized to accommodate insertion of the end 191 of a motor shaft 106.

First end 150 of the adapter shaft 126 is defined by an annular segment 159 having a perimeter which corresponds to that of the perimeter of torque cap 120. The end 150 of the adapter shaft 126 further contains two arcuate tab protrusions 160 at the perimeter which are disposed at diametrically opposed locations about the end 150. First end 150 further defines recessed area 192, and bore hole 156. The tab protrusions 160 are sized for interlacing with the recessed perimeter features 142 found in the torque cap 120. Each tab protrusion 160 has a groove 162 on the external surface that defines a recessed area to help capture retaining ring 128 when the wiper extension 100 is assembled. The recessed area 192 is sized to accommodate lock nut 124 and washer 122.

At end 152 of the adapter shaft 126 a cylindrical protrusion 163 and features generally corresponding to those at the end of motor shaft 106 can be seen. In general, the end 152 of adapter shaft 126 is shaped to couple to a fitting 112 of an existing windshield wiper 108.

Therefore, the wiper extension 100 may be assembled as set forth in the following description in some embodiments. First, the torque cap 120 is placed on the motor shaft 106 by inserting motor shaft 106 into the aperture 136. Next, retaining ring 128 is expanded and installed over the groove 140 of the torque cap 120. Locking washer 122 and locknut 124 are secured onto the motor shaft 106 and tightened in place to secure torque cap 120 to the motor shaft 106. Finally, adapter shaft 126 coupled to the remainder of the wiper extension 100. Coupling the adapter shaft 126 includes axially aligning the motor shaft 106 with the bore 156 in end 150. Further, tab protrusions 160 must be aligned with the recessed perimeter features 142 found in the torque cap 120. Also, the grooves 162 on each of the tab protrusions 160 should engage and grip the retaining ring 128 once the wiper extension is assembled together.

The assembled configuration is thereby able to effectively provide a two piece coupling held together using a retaining ring. Therefore, if the associated window 104 needs to be pushed open in an emergency, the window frame of window 104 is designed to push against the wiper arm 108 to overcome the retention force of the retaining ring 128 thereby causing the wiper arm to break away together with the adapter shaft 126. Once the wiper 108 has broken away, the area in front of the window 104 is cleared for free motion of the window 104 and the unimpeded exit of vehicle occupants.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A break-away wiper arm assembly for a vehicle having an emergency egress window system, the assembly comprising:
    a wiper arm;
    a wiper extension connected to the wiper arm at a first end; and
    a wiper motor shaft at an opposing second end,
    said wiper extension includes a torque cap fastened to the wiper motor shaft, said torque cap holding an adapter shaft by way of a retaining ring,
    said adapter shaft includes at least one tab which mates with a recess within an arcuate projection of the torque cap.

2. The break-away wiper arm assembly of claim 1 wherein the retaining ring is a semi-flexible ring disposed within a groove in the torque cap.

3. The break-away wiper arm assembly of claim 2 wherein the ring is a split ring.

4. The break-away wiper arm assembly of claim 1 wherein the wiper extension adapter shaft extends through a bore defined by the torque cap.

5. The break-away wiper arm assembly of claim 4 wherein a fastener is connected to the wiper motor shaft, said fastener sized to fit within a central recess surrounding the bore of the torque cap.

6. The break-away wiper arm assembly of claim 5 wherein the fastener is a washer and a locknut.

7. The break-away wiper arm assembly of claim 1 wherein the tab includes a grooved section, said grooved section matching the groove of the torque cap so that the groove circumscribes the wiper extension.

8. The break-away wiper arm assembly of claim 1 wherein the adapter shaft includes a cylindrical protrusion for connecting the wiper arm to the wiper extension.

9. The break-away wiper arm assembly of claim 1 wherein the adapter shaft defines a frustoconical recess sized for the wiper motor shaft.

* * * * *